(12) United States Patent
Willat

(10) Patent No.: US 6,725,505 B2
(45) Date of Patent: Apr. 27, 2004

(54) DEFORMABLE GRIP FOR A MANUAL IMPLEMENT

(75) Inventor: Boyd I. Willat, Los Angeles, CA (US)

(73) Assignee: Willat Ergonomic Technologies, Carlsbad, CA (US)

( * ) Notice: Subject to any disclaimer, the term of this patent is extended or adjusted under 35 U.S.C. 154(b) by 0 days.

(21) Appl. No.: 10/218,248

(22) Filed: Aug. 13, 2002

(65) Prior Publication Data

US 2003/0029002 A1 Feb. 13, 2003

Related U.S. Application Data

(60) Provisional application No. 60/311,923, filed on Aug. 13, 2001.

(51) Int. Cl.$^7$ .............................. A46B 5/02; B25G 1/01
(52) U.S. Cl. ........................ 16/430; 16/431; 16/111.1
(58) Field of Search ...................... 16/430, 431, 111.1; 81/489–492

(56) References Cited

U.S. PATENT DOCUMENTS

| | | | | |
|---|---|---|---|---|
| 782,388 A | * | 2/1905 | Goldsmith | 15/443 |
| 2,205,769 A | * | 6/1940 | Sweetland | 81/492 |
| 3,782,390 A | * | 1/1974 | Johnson | 36/154 |
| 4,050,727 A | * | 9/1977 | Bonnes | 294/49 |
| 4,719,063 A | * | 1/1988 | White | 264/45.2 |
| 5,190,504 A | * | 3/1993 | Scatterday | 482/49 |
| 2002/0119270 A1 | * | 8/2002 | Daniel, Jr. | 428/36.9 |

* cited by examiner

*Primary Examiner*—Anthony Knight
*Assistant Examiner*—Michael J. Kyle
(74) *Attorney, Agent, or Firm*—Kelly Bauersfeld Lowry & Kelley, LLP

(57) ABSTRACT

A deformable grip is provided for a manual implement or other substrate such as a handle for a cooking vessel or a hair brush or the like, wherein the grip resiliently conforms to individualized anatomical contours and preferences thereby providing enhanced user comfort with reduced fatigue. The deformable grip includes a resilient outer sleeve mounted on the implement in a position for manual grasping during normal use, wherein this outer sleeve encloses at least one internal cavity containing a selected quantity of shape-deformable balls to provide the outer sleeve with a deformable tactile feel during normal use. These resilient balls are sufficiently deformable to accommodate injection into the cavity through a hollow needle passed through a small puncture port formed in the sleeve, followed by return to a normal size and shape sufficiently large to prevent backflow leakage through the puncture port to the sleeve exterior.

28 Claims, 6 Drawing Sheets

DEFORMABLE GRIP FOR A MANUAL IMPLEMENT

This application claims benefit of patent application Ser. No. 60/311,923 filed Aug. 13, 2001.

BACKGROUND OF THE INVENTION

This invention relates generally to improvements in manually grasped implements such as a cooking vessel, hair brush, paint brush, sports racquet or bat, hand tool, writing instrument, as well as virtually any other type of manually grasped device having a handle or related substrate for manual grasping or engagement. More specifically, this invention relates to an improved deformable grip responsive to user hand and/or fingertip pressure or the like to assume a highly comfortable and low fatigue geometric configuration.

Manual implements generally incorporate a handle or related structure having a size and shape for appropriate manual grasping and manipulation of the implement during normal intended use. In one common form, the handle structure comprises an elongated rigid element having one end securely connected to the implement, such as a cooking pot or pan, a hair brush, a tool head, etc. In another common form, the manual implement is normally grasped directly about the body thereof, such as in the case of writing and other marking instruments, baseball and softball bats, etc. In either case, a variety of improved grips have been developed in recent years for use with such manual implements, primarily to provide a relatively soft and resilient or cushioned grip structure for enhanced user comfort and improved control of the manual implement during normal use thereof.

In the past, cushioned grip structures for relatively large manual implements such as sports equipment, hand tools, cookware, and hair brushes and the like have generally been limited to relatively soft and resilient rubber or rubber-like elastomer sleeves or sleeve-like wraps mounted onto the implement handle. While such grip structures beneficially provide a degree of cushioning for improved user comfort, the relative deformation of such grip structures during normal use is inherently limited. In other words, such grip structures have generally not provided a high degree of shape deformation needed to assume a customized ergonomical shape conforming closely to the anatomical contours of an individual user's hand and/or fingers, wherein such customized shape is conducive to substantially optimized user comfort with substantially minimized user fatigue.

In relatively small manual implements such as writing instruments and the like, cushioned grip structures are similarly provided in the form of resilient elastomer sleeves and the like. In some designs, an outer resilient sleeve encloses an internal cavity which is filled with a flowable substance such as a deformable putty or relatively viscous liquid adapted to displace and thereby achieve substantial shape deformation when the grip structure is manually grasped. See, for example, U.S. Pat. No. 5,000,599. Such grip structures can undergo substantial shape deformation to conform closely to the anatomical contours of a particular user's hand and/or fingertips for enhanced user comfort. However, in grip structures of this type, special attention is required to properly close and seal the internal cavity subsequent to placement of the flowable substance therein, in order to prevent leakage of the flowable substance. Moreover, notwithstanding proper sealing of this internal cavity, backflow leakage of the flowable substance can still occur in the event that the outer sleeve is damaged in a manner forming a small hole or tear therein. Such leakage of the flowable substance not only results in loss of the desired deformable and resilient grip characteristics, but also creates an unsightly and undesirable mess.

The present invention is directed to further improvements in and to deformable grips for use with a wide range of large and small manual implements, wherein the improved deformable grip incorporates a flowable resilient filler material contained within an internal chamber or cavity defined by a resilient outer grip structure such as a sleeve, and further wherein undesired backflow leakage of the filler material is substantially precluded.

SUMMARY OF THE INVENTION

In accordance with the invention, an improved deformable grip or cushioned pad is provided for use with a manually grasped or manually engaged implement to provide a soft and resilient structure having the capacity for shape adaptation in conformance with the anatomical contours and particular grasping technique of an individual user. The deformable grip is designed to assume a custom fit configuration when the implement is grasped or gripped by the user for enhanced user comfort and control with reduced fatigue. The deformable grip comprises an outer resilient and flexible grip structure such as an outer sleeve mounted on the implement, as by mounting onto an implement handle, to define and substantially enclose at least one internal chamber or cavity which is filled at least partially with a flowable resilient filler material in the form of a selected quantity of resilient balls having sufficient shape elasticity to provide the sleeve with a selected and deformable tactile feel during normal use. These resilient balls are sufficiently deformable to accommodate injection into the sleeve cavity through a hollow tube or needle passed through a small puncture port formed in the sleeve, followed by return to a normal size and shape sufficiently large to prevent backflow leakage through the puncture port to the sleeve exterior.

In a preferred form, the outer grip structure comprises an outer sleeve having a generally cylindrical component formed from a resilient and flexible silicon-based elastomer or the like. This outer sleeve is formed or otherwise suitably assembled with an inner liner and cooperating therewith to define the at least one internal chamber or cavity of selected size and shape, such as a generally annular cross sectional configuration. In an alternative preferred form, the internal cavity or chamber can be provided in the configuration of one or more localized pads formed at one or more selected positions on the grip structure. The outer sleeve and inner liner are mounted onto the implement such as by mounting onto an elongated implement handle in a selected position for manual grasping during normal use of the implement. The at least one internal chamber is at least partially filled by injecting a selected quantity of the resilient balls under pressure, as by use of syringe or the like, through a hollow injection needle passed through the outer sleeve via a small puncture port or the like formed therein. During this injection step, the resilient balls assume a narrow cross sectional size sufficiently small to pass through the hollow bore of the injection needle, and thus also through the puncture port, into the internal cavity. However, within the internal cavity and upon release of the injection pressure, the resilient balls return substantially to an initial nondeformed state each having a cross sectional size substantially in excess of the puncture port size. As a result, within the internal cavity, the resilient balls assume a size which prevents backflow leakage through the puncture port to the exterior of the outer sleeve, without requiring the puncture port to be sealed. Normal pressure applied via the outer sleeve to the resilient balls during use of the manual implement is inadequate to deform the balls sufficiently for backflow leakage through the puncture port.

In one preferred form, the resilient balls are formed from polyurethane foam each having a diametric size of about 1/32 inch. To facilitate injection through the hollow needle into the internal cavity, and to enhance ball flowability in response to manual pressure applied to the deformable drip during normal use, the resilient balls may desirably be coated with a liquid silicon lubricant. During normal use, the puncture port formed in the outer sleeve normally exhibits sufficient self-sealing characteristics to prevent backflow leakage of any significant portion of the lubricant.

Other features and advantages of the invention will become more apparent from the following detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 1:
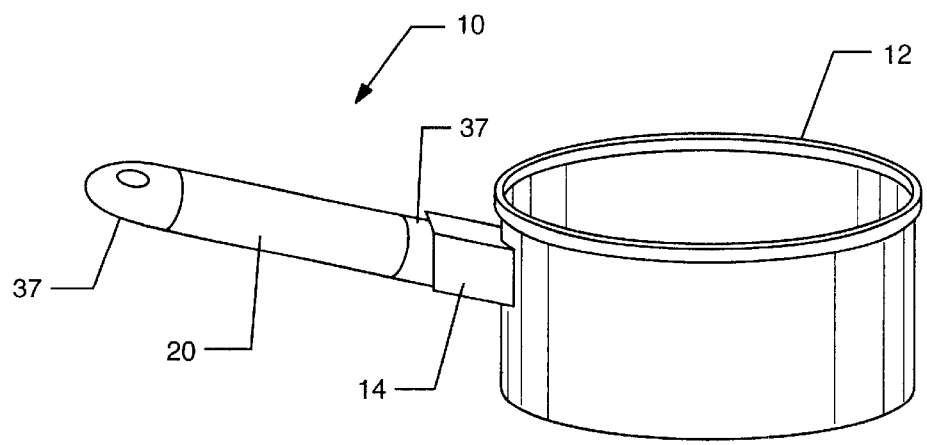
FIG. 1 is a perspective view illustrating a manual implement in the form of a cooking pan incorporating an improved deformable grip constructed in accordance with the present invention.

As shown in the exemplary drawings, an improved deformable grip referred to generally in FIGS. 1–6 by the reference numeral 10 is provided on a manually grasped implement such as the illustrative cooking pan 12 (FIG. 1). The deformable grip 10 is designed to flexibly and resiliently change shape in response to applied manual pressure during normal implement use, so that the grip 10 conforms geometrically to the anatomical contours and particular grasping technique of an individual user. In this manner, the deformable grip 10 provides significantly enhanced user comfort and reduced user fatigue.

The deformable grip 10 of the present invention is shown in the exemplary drawings for use with the cooking pan 12, although persons skilled in the art will recognize and appreciate that the concept may be beneficially applied to a wide variety of manually grasped implements such as hair brushes, hand tools, sports equipment, writing and marking instruments, etc. The illustrative drawings show the deformable grip 10 mounted on or otherwise constituting an elongated substrate or handle 14 attached to and extending outwardly from the cooking pan 12 at one side thereof. The grip 10 is positioned for normal grasping by a user's hand and fingers 18 (FIG. 3) as the cooking pan 12 is held and manipulated during normal use. In general terms, the deformable grip 10 provides a cushioned structure which advantageously conforms when grasped to a customized or personalized shape fit.

In accordance with a primary aspect of the invention, this cushioned structure comprises a resilient and flexible member defining at least one internal chamber or cavity. In the illustrative embodiment as shown, the resilient member comprises an outer grip structure shown in the form of an outer membrane or sleeve 20 defining the at least one internal chamber or cavity 22 which is at least partially filled with a selected quantity of a flowable resilient filler material 24 in the form of resilient shape deformable bodies such as balls. These resilient balls 24 are formed from a selected compressible elastomer or the like capable of assuming a small cross sectional size for injection into the sleeve cavity 22 through via a small port 26, but thereafter expand to a substantially larger cross sectional size and shape so that backflow leakage of the resilient balls through the port 26 to the exterior of the grip 10 is substantially precluded. Within the sleeve cavity 22, the resilient balls 24 displace in response to manual grasping of the sleeve 20 to provide the deformable grip 10 with the desired soft and resilient tactile feel having an ergonomical shape custom-fitted to the configuration of an individual person's hand and fingers 18.

More particularly, and as shown in the illustrative drawings with respect to one preferred form of the invention, the handle 14 of the cooking pan 12 includes an elongated handle base 36 having one end attached securely in a suitable manner to the pan 12 and projects generally radially outwardly therefrom. An elongated annular gap or recess is defined along a substantial portion of the length of the handle base 36, as by mounting a pair of end blocks 37 generally at the inboard and outboard ends thereof. These end blocks 37 respectively define a pair of axially facing shoulders 39 at the axially opposite ends of the annular gap.

Figure 2:
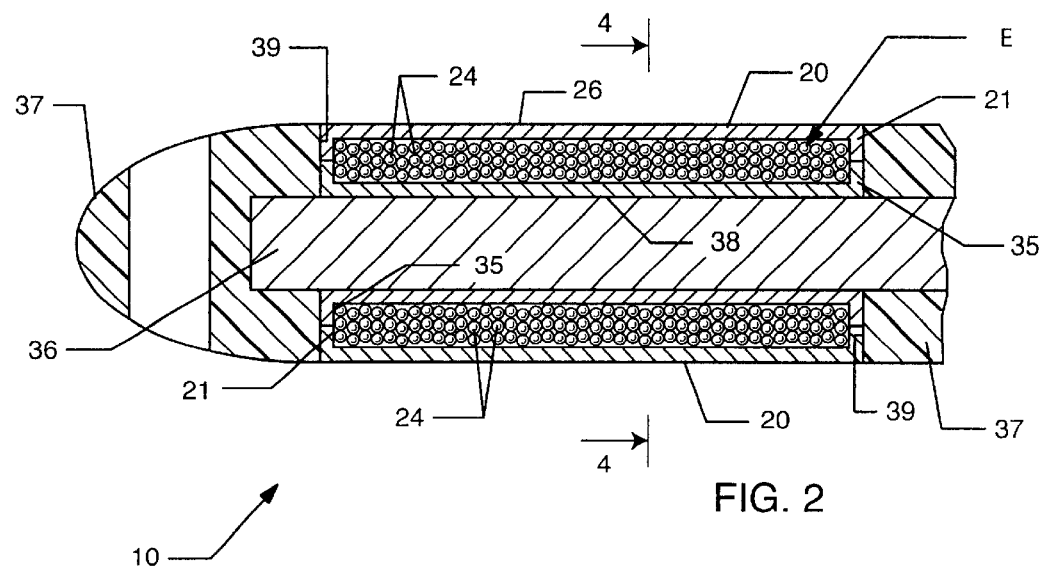
FIG. 2 is an enlarged fragmented longitudinal sectional view of the deformable grip of FIG. 1, with portions broken away to reveal construction details of the deformable grip and mounting thereof onto a handle of the cooking pan.
Figure 3:
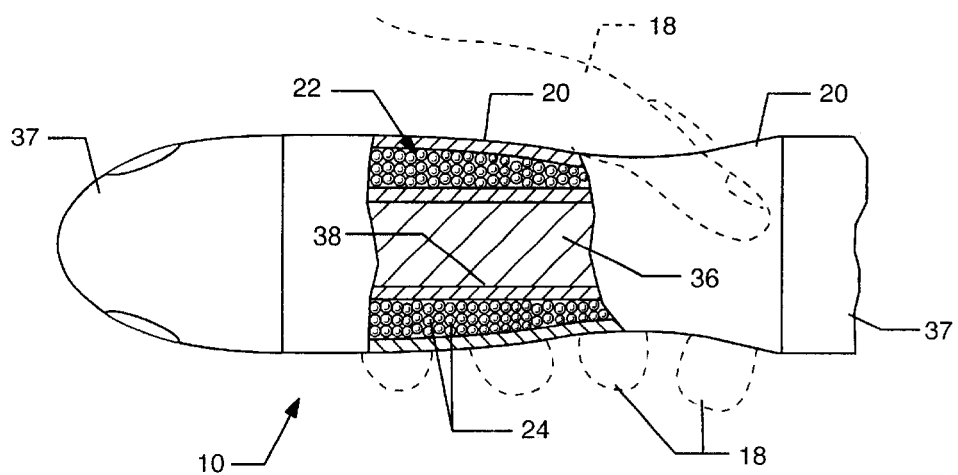
FIG. 3 is an enlarged and fragmented side elevation view of the deformable grip, illustrating manual grasping during normal use.
Figure 4:
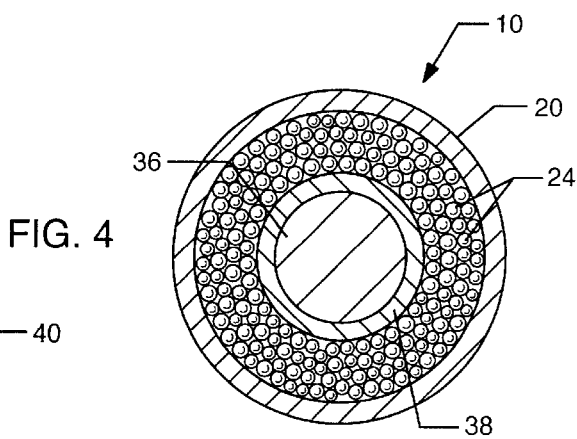
FIG. 4 is an enlarged transverse sectional view taken generally on the line 4—4 of FIG. 2.
Figure 5:
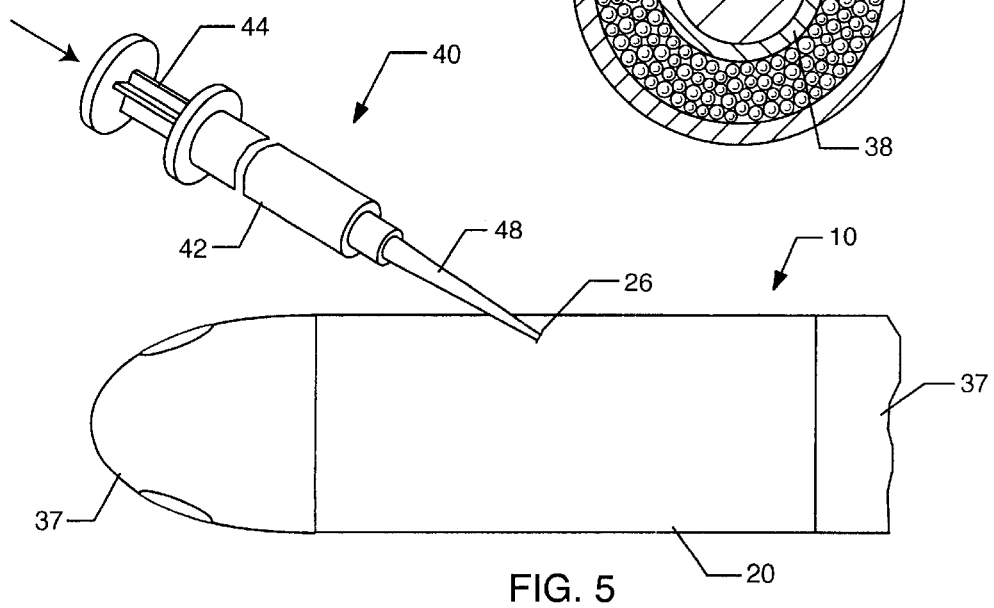
FIG. 5 is a fragmented perspective view depicting injection of a flowable filler material into the deformable grip.

The outer sleeve 20 is mounted onto the handle for substantially closing this annular gap between the end blocks 37. As shown, the outer sleeve 20 has a generally cylindrical shape to provide a substantially smooth-surfaced and attractive-appearing grip structure which may incorporate a contoured or curved geometry blending smoothly with the handle 14. In a preferred form, the flexible outer sleeve 20 is constructed from a relatively thin and flexible rubber-based or deformable plastic or elastomer material, such as a silicon rubber having a relatively high tear strength to resist significant tearing or rupture during normal use. As shown in FIG. 2, the opposite ends of the sleeve 20 are down-turned to define short flanges 21 adapted for secure and substantially sealed attachment as by an adhesive or sonic welding to a mating pair of radially out-turned flanges 35 on a cylindrical inner liner 38 which is also formed from a selected rubber-based or deformable plastic type material. The outer sleeve 20 thus cooperates with the inner liner 38 to form a sealed or substantially sealed bladder of selected size and shape, such as the illustrative generally annular shape defining the internal sleeve cavity 22, also of generally annular shape.

The resilient, cavity-defining member comprising the assembled outer sleeve 20 and inner liner 38 is normally mounted onto the implement handle 14 prior to filling of the cavity 22 with the resilient balls 24. In this regard, FIG. 2 shows these assembled components seated within the annular gap defined between the end blocks 37, with the opposite ends of the sleeve and liner 20, 38 abutting the axially facing shoulders 39 of the two end blocks 37.

Figure 6:
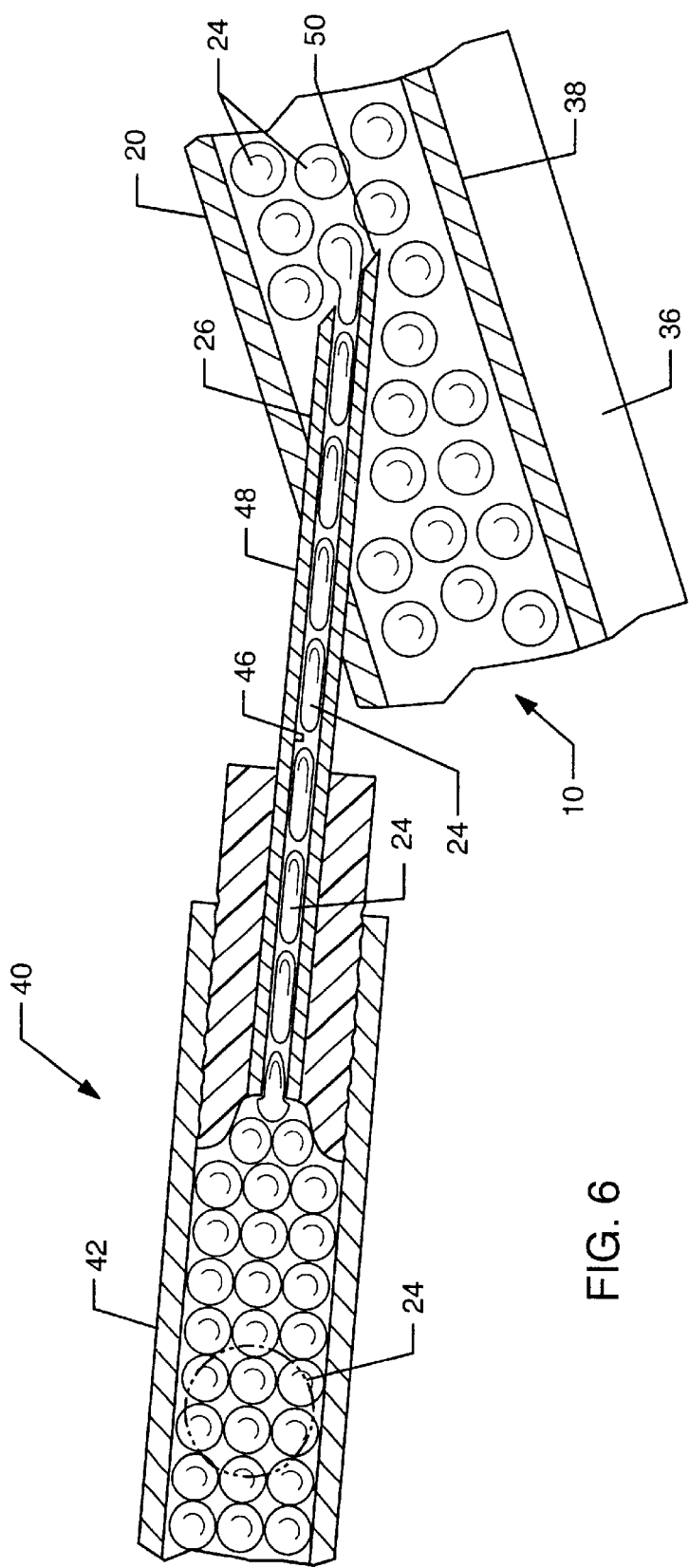
FIG. 6 is an enlarged and fragmented perspective showing the injection of the filler material in more detail.

A syringe 40 (FIGS. 5 and 6) includes a barrel 42 loaded with a prescribed quantity of the resilient balls 24, with a plunger 44 slidably carried within the barrel 42 for pressure delivery of the balls 24 through a narrow bore passage 46 defined through a hollow injection needle 48 mounted at a front or nose end of the syringe barrel. This injection needle 48 includes a sharp tip 50 for puncturing or piercing the flexible sleeve 20 to form the small injection port 26 therein. The plunger 44 can then be advanced within the barrel 42 for applying a sufficient and relatively high pressure to the resilient balls 24, so that the balls 24 each deform to an elongated yet narrow cross sectional size for flow passage through the needle bore 46 into the sleeve cavity 22. FIG. 6 illustrates such deformation of the resilient balls 24 for essentially single file flow through the needle 48 into the sleeve cavity 22. Importantly, within the sleeve cavity 22, the applied pressure on the resilient balls 24 is substantially released to permit the balls to return substantially to their initial uncompressed or nondeformed and typically spheroid shape having a diametric size significantly greater than the size of the puncture port 26.

Within the sleeve cavity 22, the resilient balls 24 provide a resilient and deformable cushioned structure underlying the outer flexible sleeve 20, to thereby provide the desired soft tactile feel when the manual implement 12 is grasped and used in a normal manner. In this regard, the resilient balls 24 slide over one another and shift about within the sleeve cavity 22 to provide the desired deformation characteristics, and further wherein the resilient balls 24 may exhibit a memory tendency to resiliently retain a customized deformed shape associated with a particular user. Such slide-shift movement of the balls 24 may be enhanced by lightly coating the balls with a liquid lubricant such as a silicon lubricant which additionally assists is smooth flow of the balls 24 through the injection needle 48 into the sleeve cavity 22. Importantly, during this normal use, the resilient balls 24 are exposed to relatively low hand and/or finger tactile pressure which is insufficient to deform the balls to fit through the puncture port 26. Accordingly, pursuant to one primary aspect of the invention, backflow leakage of the resilient balls 24 is effectively prevented by virtue of the ball size relative to the size of the puncture port 26, without requiring any special or additional sealing of the puncture port.

Although the resilient balls 24 may be formed from a variety of different elastomer or other materials having the appropriate size and shape elasticity, one preferred material comprises polyurethane foam balls having a diametric size of about $\frac{1}{32}$ inch. Such resilient balls 24 may be lightly coated with a liquid-based silicon lubricant prior to injection into the sleeve cavity 22. After injection, such balls 24 and the associated lubricant will be retained within the cavity 22, substantially without any undesired leakage therefrom, without requiring sealed closure of the injection port 26.

Figure 7:
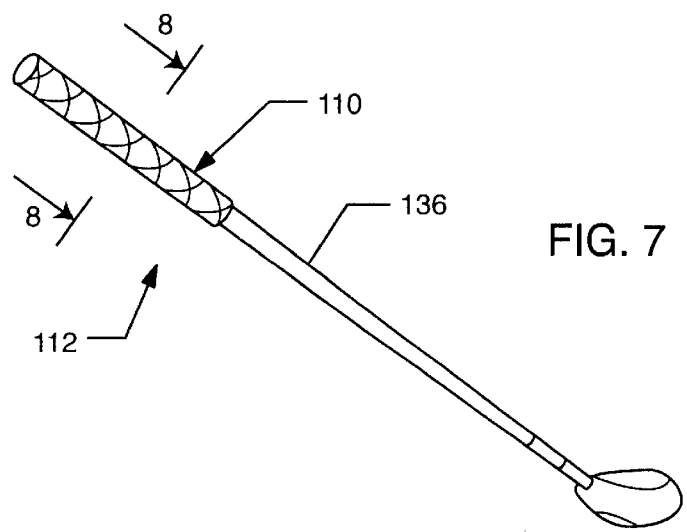
FIG. 7 is a perspective view illustrating a manual implement in the form of a golf club incorporating an improved deformable drip constructed in accordance with an alternative preferred form of the invention.
Figure 8:
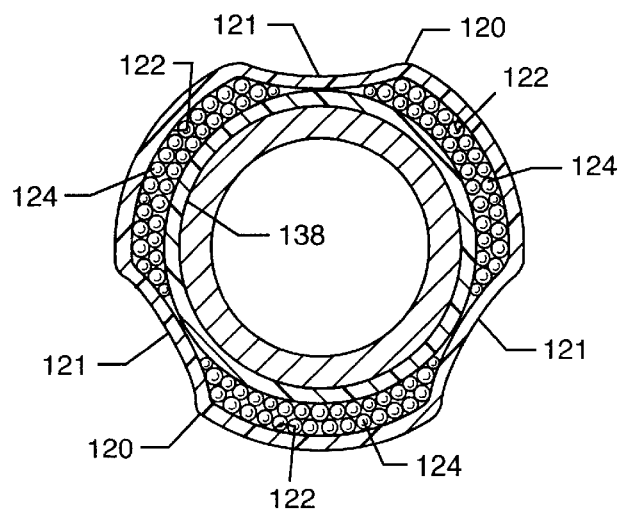
FIG. 8 is an enlarged sectional view taken generally on the line 8—8 of FIG. 7.
Figure 9:
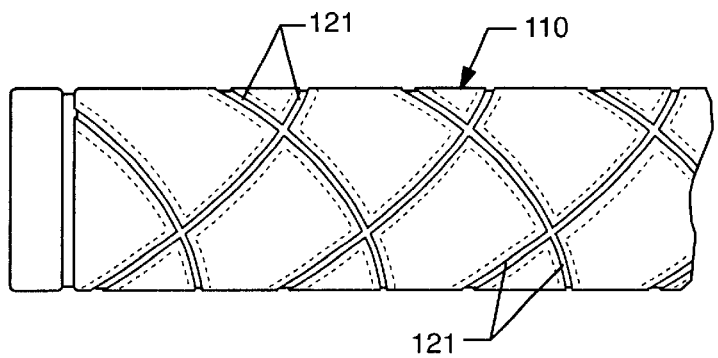
FIG. 9 is an enlarged fragmented plan view illustrating a portion of the deformable grip shown in FIGS. 7–8.

FIGS. 7–9 illustrate one alternative preferred form of the deformable grip of the present invention, wherein components corresponding structurally and functionally to those shown and described in FIGS. 1–6 are identified by common reference numerals increased by 100. As shown, a resilient deformable grip 110 is provided for mounting onto an elongated handle 136 of a manual implement 112, such as an item of sports equipment shown in the form of a golf club. In this embodiment, the deformable grip 110 incorporates a plurality of relatively small internal chambers or cavities 122 formed within a resilient member, wherein each of these cavities 122 is at least partially filled with the resilient balls 124 according to the previously described manner and method to provide a plurality of localized resilient or cushioned raised pads. The resilient pads can be provided in a selected size and shape, and distributed over substantially the entire area of the grip structure (as shown) or alternately provided at one or more key locations (i.e., wherein the pads are formed individually or in rows or other selected configuration) to provide the desired soft and resilient tactile feel during use of the manual implement.

As shown best in FIG. 8, the illustrative golf club grip 110 comprises an inner liner 138 assembled with an outer sleeve 120 to form the desired array of internal chambers or cavities 122. In this regard, the inner liner 138 and outer sleeve 120 can be manufactured by forming appropriate sealed margins 121 at the periphery of each cavity 122, as by heat seaming or by ultrasonic welding processes or the like. The resultant individual cavities 122 can then be suitable filled with the resilient balls 124 in the manner previously described with respect to FIGS. 1–6. Such filling of the cavities 122 can occur prior to or following installation of the deformable grip 110 onto the elongated handle shaft 136 of the golf club.

Figure 10:
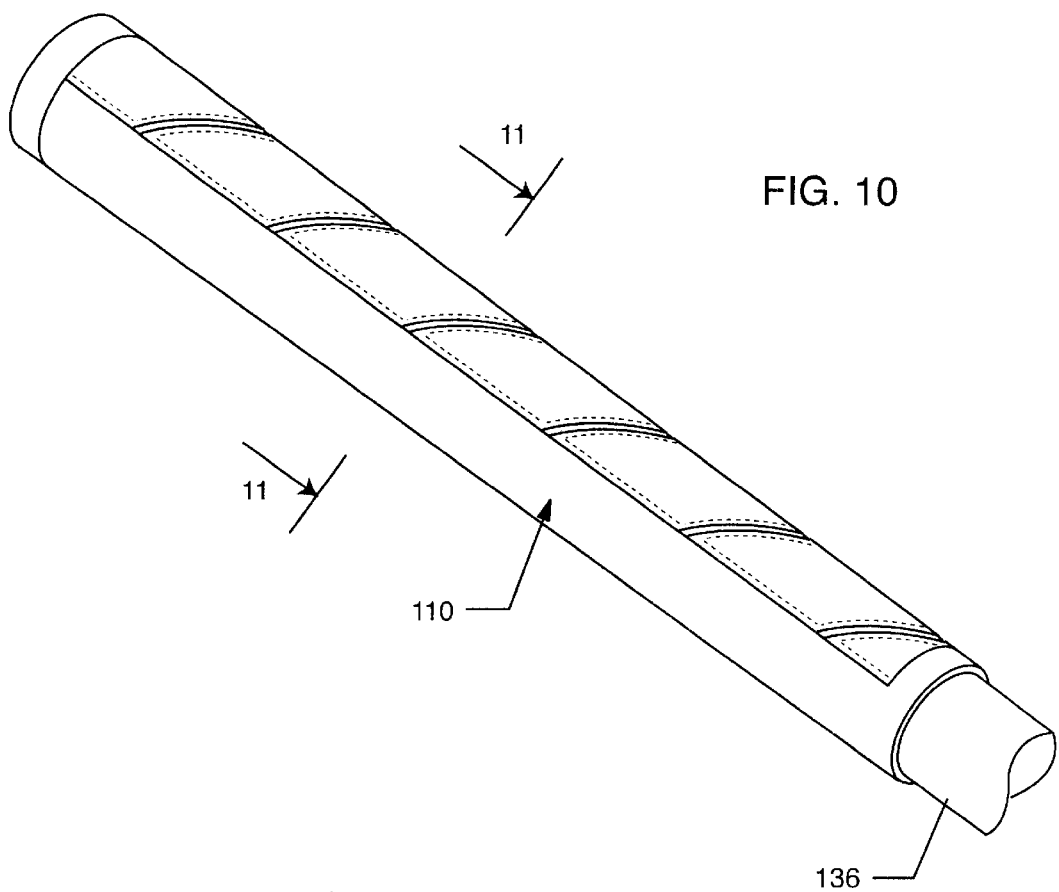
FIG. 10 is an enlarged fragmented perspective view of a handle grip portion of a golf club, similar to a portion of FIG. 7, but depicting a further alternative preferred form of the invention.
Figure 11:
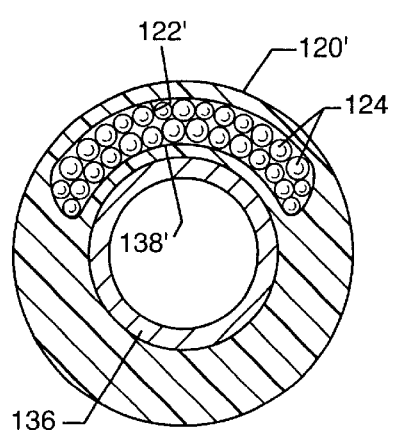
FIG. 11 is an enlarged sectional view taken generally on the line 11—11 of FIG. 10.

FIGS. 10–11 illustrate a further alternative preferred form of the invention, wherein the illustrative golf club grip 110 is mounted onto the club handle or shaft 136, and incorporates a plurality of raised and cushioned pads arranged in a row. In this embodiment, a resilient grip structure is formed from a selected elastomer or the like to define a modified inner liner 138' over a portion of the grip 110, with a modified overlying outer sleeve segment 120' which cooperates with the inner liner 138' to define internal chambers or cavities 122'. The outer sleeve segment 120' is secured to the inner liner 138' at appropriate intervals by margins 121' to form the multiple cavities 122' arranged in the row as shown. These cavities 122' can be filled with the resilient balls 124 in the manner previously described, to provide the desired grip construction.

Figure 12:
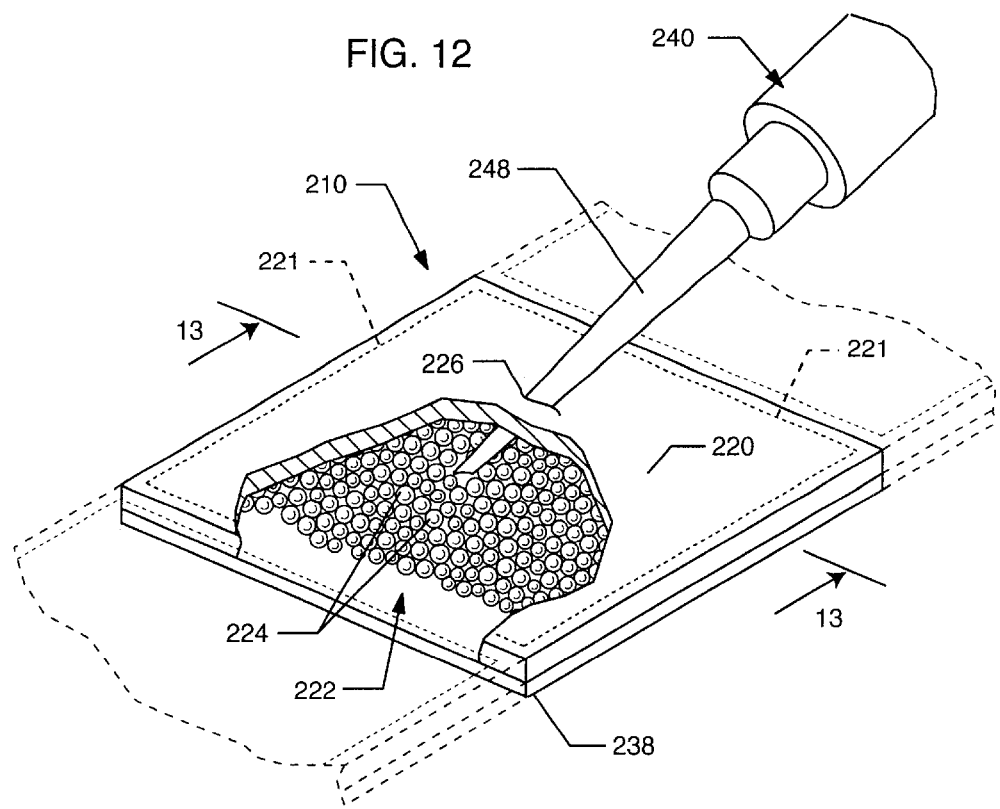
FIG. 12 is a fragmented perspective view showing another alternative preferred embodiment of the invention, depicted in the form of a resilient cushioned pad.
Figure 13:
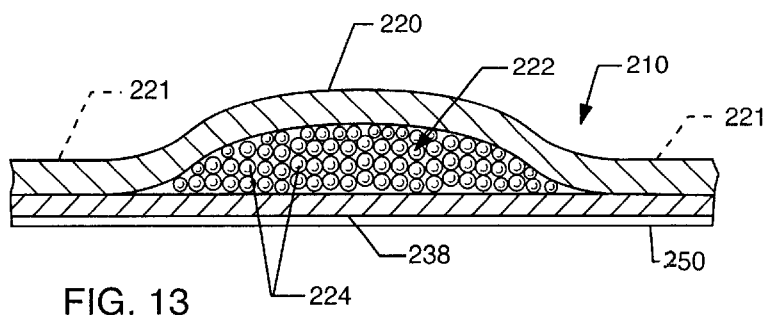
FIG. 13 is a vertical sectional view taken generally on the line 13—13 of FIG. 12.

FIGS. 12–13 depict still another alternative preferred embodiment of the invention, wherein a resilient cushioned pad 210 is provided for mounting upon a selected substrate to provide a soft and resilient structure. For ease and clarity of description, functional counterpart structures to those shown and described in FIGS. 1–6 are identified by common reference numerals increased in by 200. As shown, the resilient pad 210 comprises outer and inner resilient liners 220 and 238 of selected and generally conforming size and shape, such as the illustrative square shape, and joined together as by heat seal or sonic welding or the like along a peripheral margin 221 to define an open internal cavity 222 between the liner elements 220, 238. This internal cavity 222 is at least partially filled with a selected quantity of a flowable resilient filler material 224 in the form of the resilient balls or the like as previously described herein, wherein these resilient balls 24 are formed from a selected compressible elastomer or the like capable of assuming a small cross sectional size for injection into the sleeve cavity 222 through via a small port 226 in the outer liner 220, but thereafter expand to a substantially larger cross sectional size and shape so that backflow leakage of the resilient balls through the injection port 226 to the exterior of the pad structure 210 is substantially precluded. A syringe 240 including a sharp-tipped injection needle 248 is provided for injecting the resilient balls 224 into the cavity 222. As in the prior-described embodiments, the resilient balls 224 deform sufficiently under injection pressure to pass through the injection needle 248 into the cavity 222, wherein the resilient balls 224 expand to a normal unstressed size and shape that is larger than the size of the injection port 226. Within the pad cavity 222, the resilient balls 224 displace in response to manual contact with the pad structure 210 to provide a desired soft and resilient tactile feel.

The pad structure 210 shown in FIGS. 12–13 can be constructed in the single cavity form as shown, or in a multi-cavity geometry having multiple single cavity structures linked together in a desired pattern. In this regard, as viewed in dotted lines in FIG. 12, a plurality of the individual pad structures 210 may be manufactured in-line, in a continuous automated process which joins the outer and inner liners 220, 238 to each other to form the succession of ball-receiving cavities 222. Alternately, if desired, multiple pad structures can be manufactured in a continuous automated process to form a rectangular array of individual pad structures 210 with a selected multiple number of pad structures in side-by-side relation extending across the width of the array. In either arrangement, the multiple pad structures 210 are adapted for separation in a selected number of one or more and in a selected geometric array for mounting onto a selected substrate to provide a soft and tactile feel when manually contacted. A wide range of different specific substrate uses are envisioned, including but not limited to attachment to wrist and hand supports for computer keyboard and mouse users, attachment to a telephone handset, attachment to the armrest of a chair, and attachment to the grasped section of virtually any manually grasped implement such as a hand tool or vehicle gear shift knob, etc. The pad structures can be made in a generally flat configuration and then attached to a manual implement having a flat or other shape, with the liners 220, 238 flexibly conforming to the shape of the implement to which the pad structure is secured. Mounting of the pad structure onto the selected substrate may by accomplished by providing any suitable mounting means such as a layer of a selected pressure sensitive adhesive 250 (FIG. 13) or the like to the underside of the inner liner 238.

A variety of further modifications and improvements in and to the deformable grip 10 and the deformable pad structure 210 of the present invention will be apparent to those persons skilled in the art. For example, it will be recognized further that the geometry of the outer grip or pad structure such as the outer sleeve 20 may be premolded with a contoured and/or ribbed surface or otherwise suitably textured configuration for further enhanced grip utility and comfort during use. Persons skilled in the art will also recognize and appreciate that the outer grip or pad structure such as the outer sleeve 20 may be adapted for mounting directly onto the handle base 36 or analogous structure for cooperatively defining the internal chamber or cavity 22 of selected size and shape. Accordingly, no limitation on the invention is intended by way of the foregoing description and accompanying drawings which are directed to selected illustrative embodiments of the invention, except as set forth in the appended claims.

What is claimed is:

1. A deformable grip for a manual implement, comprising:
   a resilient member defining at least one internal cavity; and
   a flowable resilient filler material contained within and at least partially filling said at least one cavity, said flowable resilient filler material comprising a plurality of shape-deformable bodies movable within said at least one cavity in response to tactile pressure;
   said resilient member further having an injection port formed therein, said shape-deformable bodies being sufficiently compressible for pressure-injection into said at least one cavity via said injection port, said shape-deformable bodies within said at least one cavity returning to an initial substantially uncompressed state having a size larger than the size of said injection port.

2. The deformable grip of claim 1 wherein said shape-deformable bodies comprise a compressible elastomer.

3. The deformable grip of claim 2 further including a lubricant carried by said shape-deformable bodies.

4. The deformable grip of claim 1 wherein said shape-deformable bodies comprise a compressible elastomer.

5. The deformable grip of claim 1 wherein said shape-deformable bodies comprise elastomer balls.

6. The deformable grip of claim 5 further including a lubricant carried by said elastomer balls.

7. The deformable grip of claim 1 wherein said resilient member comprises an outer resilient sleeve having a size and shape for mounting onto a manual implement, said sleeve and said manual implement cooperatively defining said at least one cavity.

8. The deformable grip of claim 1 wherein said resilient member comprises an outer resilient sleeve assembled with an inner liner sleeve for cooperatively defining said at least one cavity.

9. The deformable grip of claim 8 wherein said at least one cavity comprises a plurality of cavities.

10. The deformable grip of claim 9 wherein said plurality of cavities are arranged in annular array.

11. The deformable grip of claim 9 wherein said plurality of cavities are arranged in a row.

12. A cushioned pad assembly, comprising:
    a resilient member defining at least one internal cavity; and
    a flowable resilient filler material contained within and at least partially filling said at least one cavity, said flowable resilient filler material comprising a plurality of shape-deformable bodies movable within said at least one cavity in response to tactile pressure;
    said resilient member having an injection port formed therein, said shape-deformable bodies being sufficiently compressible for pressure-injection into said at least one cavity via said injection port, said shape-deformable bodies within said at least one cavity returning to an initial substantially uncompressed state having a size larger than the size of said injection port.

13. The cushioned pad assembly of claim 12 wherein said resilient member is formed from a flexible elastomer material.

14. The cushioned pad assembly of claim 12 wherein said shape-deformable bodies comprise a compressible elastomer.

15. The cushioned pad assembly of claim 14 further including a lubricant carried by said shape-deformable bodies.

16. The cushioned pad assembly of claim 12 wherein said resilient member comprises an outer resilient sleeve having a size and shape for mounting onto a substrate, said sleeve and said substrate cooperatively defining said at least one cavity.

17. The cushioned pad assembly of claim 12 wherein said resilient member comprises an outer resilient sleeve assembled with an inner liner sleeve for cooperatively defining said at least one cavity.

18. The cushioned pad assembly of claim 12 wherein said at least one cavity comprises a plurality of cavities.

19. The cushioned pad assembly of claim 18 wherein said plurality of cavities are arranged in annular array.

20. The cushioned pad assembly of claim 18 wherein said plurality of cavities are arranged in a row.

21. A method of making a cushioned pad assembly, comprising the steps of:

forming at least one internal cavity within a resilient member; and injecting a flowable resilient filler material through an injection port to at least partially fill the at least one cavity, wherein the flowable resilient filler material comprises a plurality of shape-deformable bodies movable within the at least one cavity in response to tactile pressure;

said injecting step comprising injecting said shape-deformable bodies under pressure through a hollow injection needle passed through the injection port, said shaped-deformable bodies compressing to a reduced cross sectional size upon pressure-injection thereof through the injection needle and returning within that at least one cavity to an initial substantially uncompressed state having a size larger than the size of the injection port.

22. The method of claim 21 wherein said resilient member comprises an outer liner membrane formed from a flexible elastomer material.

23. The method of claim 21 wherein said shape-deformable bodies comprise a compressible elastomer.

24. The method of claim 21 wherein said shape-deformable bodies comprise elastomer balls.

25. The method of claim 24 further including the step of coating said elastomer balls with a lubricant.

26. The method of claim 21 further including the step of forming the injection port with the injection needle.

27. The method of claim 21 wherein said cavity forming step comprises mounting the resilient member onto a manual implement whereby the resilient member cooperates with the manual implement to define the at least one cavity.

28. The method of claim 21 wherein said cavity forming step comprises assembling an outer resilient sleeve with an inner liner sleeve for cooperatively defining said at least one cavity.

* * * * *